US008923909B2

(12) United States Patent
Hunukumbure et al.

(10) Patent No.: US 8,923,909 B2
(45) Date of Patent: Dec. 30, 2014

(54) RE-SELECTING NETWORK PARAMETERS IN A CELLULAR WIRELESS NETWORK

(75) Inventors: Rajaguru Mudiyanselage Mythri Hunukumbure, Hillingdon (GB); Sunil Keshavji Vadgama, Ashford Middlesex (GB)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 13/537,409

(22) Filed: Jun. 29, 2012

(65) Prior Publication Data

US 2013/0005385 A1 Jan. 3, 2013

(30) Foreign Application Priority Data

Jun. 29, 2011 (GB) .................................. 1111057.4

(51) Int. Cl.
*H04W 4/00* (2009.01)
*H04W 16/22* (2009.01)
*H04W 24/08* (2009.01)

(52) U.S. Cl.
CPC .............. *H04W 16/22* (2013.01); *H04W 24/08* (2013.01)
USPC .......................................... 455/517; 455/507

(58) Field of Classification Search
USPC .................................................. 455/507, 517
See application file for complete search history.

(56) References Cited

U.S. PATENT DOCUMENTS

| 7,953,412 B2* | 5/2011 | Lee et al. ....................... 455/436 |
| 8,391,238 B2* | 3/2013 | Rune et al. ..................... 370/331 |
| 8,593,990 B1* | 11/2013 | Henttonen et al. ............. 370/252 |
| 8,655,969 B2* | 2/2014 | Matan et al. ................... 709/206 |
| 2007/0198387 A1* | 8/2007 | Uenohara et al. ............. 705/36 R |
| 2009/0005029 A1* | 1/2009 | Wang et al. .................... 455/423 |
| 2010/0299419 A1* | 11/2010 | Ramankutty et al. ......... 709/221 |
| 2013/0211706 A1* | 8/2013 | MacNaughtan et al. ...... 701/410 |

FOREIGN PATENT DOCUMENTS

| WO | 2008/030171 A2 | 3/2008 |
| WO | 20091078764 A1 | 6/2009 |
| WO | 20091117443 A1 | 9/2009 |
| WO | 20101132884 A1 | 11/2010 |

OTHER PUBLICATIONS

Search Report dated Oct. 17, 2011, from the corresponding GB1111057.4.

* cited by examiner

*Primary Examiner* — Bobbak Safaipour
(74) *Attorney, Agent, or Firm* — Katten Muchin Rosenman LLP

(57) ABSTRACT

A value of a parameter which affects network performance or operation of a cell in a wireless network is re-selected by: storing an indicator, representing the performance and/or operation of the network, and a criterion to be met by the indicator when the value of the parameter has been re-selected; receiving data relating to the performance or operation of the network, and deriving therefrom statistical data relating to said indicator; storing that statistical data; when the value of the parameter is to be re-selected, obtaining at least two different solutions for the value of the parameter to be re-selected; using said statistical data to determine which of the solutions obtained most satisfactorily meets said criterion for the indicator; and selecting that solution for implementation on the network.

20 Claims, 8 Drawing Sheets

RE-SELECTING NETWORK PARAMETERS IN A CELLULAR WIRELESS NETWORK

The present invention relates to re-selecting network parameters in a cellular wireless network, including (but not limited to) mobile communication networks such as LTE and LTE-Advanced, and especially (but not necessarily) a Self Organising Network (SON).

One example of where network parameters in a cellular wireless network are re-selected is where the coverage of a cell or cell sector is adjusted to compensate for outage (cell failure) of an adjacent cell or cell sector. Real time compensation for an outage involves adjusting coverage of several neighbour cells/sectors and generally there may exist a number of alternative solutions. Adapting the coverage of adjacent cell(s)/sector(s) to compensate for a cell/sector outage is now an expected feature of Self Organized Networks (SON). The common methodology for coverage compensation is to iteratively change the antenna tilt, azimuth and transmit power of adjacent cells/sectors until an optimal solution is found. Selection of the solution is normally related to making the minimal changes to the current set-up and/or minimizing no-coverage probability. These iterations are conducted over the full range of permissible values and hence can take up considerable computational effort and time.

It is desirable to provide an improved method and apparatus for re-selecting network parameters in a cellular wireless network.

According to an embodiment of a first aspect of the present invention, there is provided a method of re-selecting respective values of one or more parameters which affect network performance or operation of a cell or cell sector in a cellular wireless network, the method comprising: causing apparatus of the network to receive and store one or more indicators, representing the performance and/or operation of an aspect of the network, and at least one criterion to be met by the indicator concerned when the value of the or each parameter has been re-selected; causing apparatus of the network to receive data relating to the present and/or past performance of the network, and/or data relating to the present and/or past operation of the network, and to derive from that data statistical data relating to the or each said indicator; causing apparatus of the network to store that statistical data; when the value of the or each parameter is to be re-selected, causing apparatus of the network to obtain at least two different solutions for the value of the or each parameter to be re-selected; causing apparatus of the network to use the said statistical data to determine which of the solutions obtained most satisfactorily meets the or each said criterion for the or each indicator; and causing apparatus of the network to select that solution for implementation on the network.

According to an embodiment of a second aspect of the present invention, there is provided apparatus for re-selecting respective values of one or more parameters which affect network performance or operation of a cell or cell sector in a cellular wireless network, the apparatus comprising: indicator storage means configured to receive and store one or more indicators, representing the performance and/or operation of an aspect of the network, and at least one criterion to be met by the indicator concerned when the value of the or each parameter has been re-selected; data analysis means configured to receive data relating to the present and/or past performance of the network, and/or data relating to the present and/or past operation of the network, and to derive from that data statistical data relating to the or each said indicator; statistical data storage means configured to store that statistical data; solution obtaining means operable, when the value of the or each parameter is to be re-selected, to obtain at least two different solutions for the value of the or each parameter to be re-selected; determining means configured to use the said statistical data to determine which of the solutions obtained most satisfactorily meets the or each said criterion for the or each indicator; and implementation means configured to cause that solution to be selected for implementation on the network.

In future networks, including but not limited to SON, network operators may want to optimize other aspects, such as revenue generation, energy consumption or maintaining very high QoS in a selected area, not just coverage and capacity. The traditional cell outage compensation method is not equipped to deal with such metrics. In accordance with an embodiment of the present invention, apparatus of the network (for example a SON server) can take these performance/operation indicators and criteria into consideration and build cell/sector-based performance statistics. When a network parameter is to be re-selected, for example when a cell/sector outage is reported, apparatus of the network (for example a SON server) can implement the solution which most satisfactorily (e.g. optimizes or has the least impact on) the selected performance indicator.

The apparatus (e.g. a SON server) evaluates the impact of each solution against a given criterion and selects the most satisfactory solution. The apparatus is configured to receive data from the network (network information) relating to present and/or past performance and/or operation of one or more aspects of the network and to build up statistics from that data for the designated performance/operation indicators in respect of each sector/cell or region of the network. For example, these indicators may include the load served, the revenue generated or the power consumed by each sector/cell of the network. With larger samples of data, the apparatus can even build up statistics for a particular time of day or week. If location information of the active users is available, the apparatus can build up regions of high user demand/high revenue generation. These statistics may be like 'value' distribution graphs for the network, i.e. value in terms of revenue, energy usage, load supported by eNBs etc. The apparatus can then use this information to implement a solution that best meets the given criterion. Network data is preferably collected continually, as the factors which affect the various performance/operation indicators will vary and evolve over time.

In an embodiment of the first or second aspect of the present invention, determining which of the solutions obtained most satisfactorily meets the or each said criterion for the or each indicator may comprise calculating the maximum value for a metric $$M = \frac{1}{K}\sum_{b=1}^{b=B} w_{Ib} \cdot \frac{I'_b}{I_b} + \frac{1}{K}\sum_{c=1}^{c=C} w_{Ic} \cdot \frac{I_c}{I'_c}$$

where the total number of indicators to be considered is A, of which the number of indicators having a maximising criterion is B and the number of indicators having a minimising criterion is C, where A=B+C, $I_b$ is the value of the bth indicator of the B indicators for the present parameter value(s), $I_c$ is the value of the cth indicator of the C indicators for the present parameter value(s), $I_b'$ is the bth indicator for the possible new solution for the parameter values(s), $I_c'$ is the value of the cth indicator of the C indicators for the possible new solution for the parameter values(s), $w_{Ib}$ is a predetermined weighting factor for the bth indicator, and $w_{Ic}$ is a predetermined weighting factor for the cth indicator, where $$\sum_{b=1}^{b=B} w_{Ib} + \sum_{c=1}^{c=C} w_{Ic} = K.$$

The indicators considered in an application of the present invention may be those which relate to only a single cell/sector, or a group of cells/sectors, directly affected by the parameter re-selection, or may, more preferably, relate to all cells/sectors in a region of the network which includes not only the single cell/sector, or group of cells/sectors, directly affected by the parameter re-selection, but also any other cells/sectors (such as those neighbouring the directly-affected cells/sectors) indirectly affected by the parameter re-selection (for example, where coverage is extended by some cells/sectors, other cells/sectors may have to adjust their coverage to avoid interference).

An embodiment of the present invention can be used to facilitate everyday dynamic network performance and operational optimization. It can offer a more diverse view of the network than the traditional coverage and capacity aspects. It can yield long term benefits to the operator, who may want to optimize a certain criterion (like higher revenue generation or lower energy consumption) at a given time period. For example, an embodiment of the present invention may enable network operators to have a more flexible choice of operation to optimize different operational performance metrics to suit local and temporal network operation policy. Such intelligence and smart operation in the network is desirable, for example as it enables a network operator to differentiate its service offering from its competitors, whilst ensuring appropriate cost-economic balance in the network for their chosen business models and differentiators.

One scenario to which a method or apparatus embodying the present invention might be applied is where a network operator has planned outage of one or more targetted cells or cell sectors, for example by turning off a base station/eNodeB for servicing or turning off a number of base stations/eNodeBs as an energy saving measure during periods of low traffic demand.

Alternatively an embodiment of the present invention may be applied to compensating for unplanned cell/sector outage. Depending on the policy adopted by the network operator, that is depending upon what factors (for example, revenue, energy consumed, load supported, customers dissatisfied/lack of service, profitability, etc.) are prioritized by the operator, it is entirely possible that a less favourable solution in terms of coverage may be preferable, for example because it serves a higher number of customers rather than focusing on geographical coverage probability.

In particular, in an embodiment of the present invention, the value of the or each parameter may be re-selected so as to adapt the coverage of a cell or cell sector of the cellular wireless network so as to cover at least part of a coverage hole of an adjacent cell or cell sector. In this case, the step of causing apparatus of the network to obtain at least two different solutions for the value of the or each parameter to be re-selected may comprise causing the apparatus to employ at least two different cell/cell sector compensation algorithms to determine at least two solutions for the value of the or each parameter which when implemented on the network would adapt the coverage of one or more cell or cells sectors so as to cover at least part of the said coverage hole.

In a method or apparatus embodying the present invention, the indicator may for example be cell, or cell sector, transmit power and the criterion may be whether the solution provides the minimum overall increase in transmit power of the network.

Alternatively, the indicator may be network load and the criterion may for example be whether the solution provides the maximum possible improvement in network load.

Another alternative is that the indicator is, for example, cell, or cell sector, quality of service and the criterion is whether a quality of service metric for the solution exceeds a specified value.

A further alternative is that the indicator is, for example, number of served users and the criterion is whether the solution provides the maximum of served users having at least a specified level of coverage.

In an embodiment of the present invention it may be that none of the solutions is selected using the sole criterion that the probability of no coverage in a cell or cell sector of the network, or the degree of change to the current network configuration, is minimised.

According to a third aspect of the present invention, there is provided a computer-readable medium carrying instructions which, when carried out on a computer, cause that computer to carry out a method embodying the first aspect of the present invention or to become apparatus embodying the second aspect of the present invention.

Reference will now be made, by way of example, to the accompanying drawings, in which.

Figure 1:
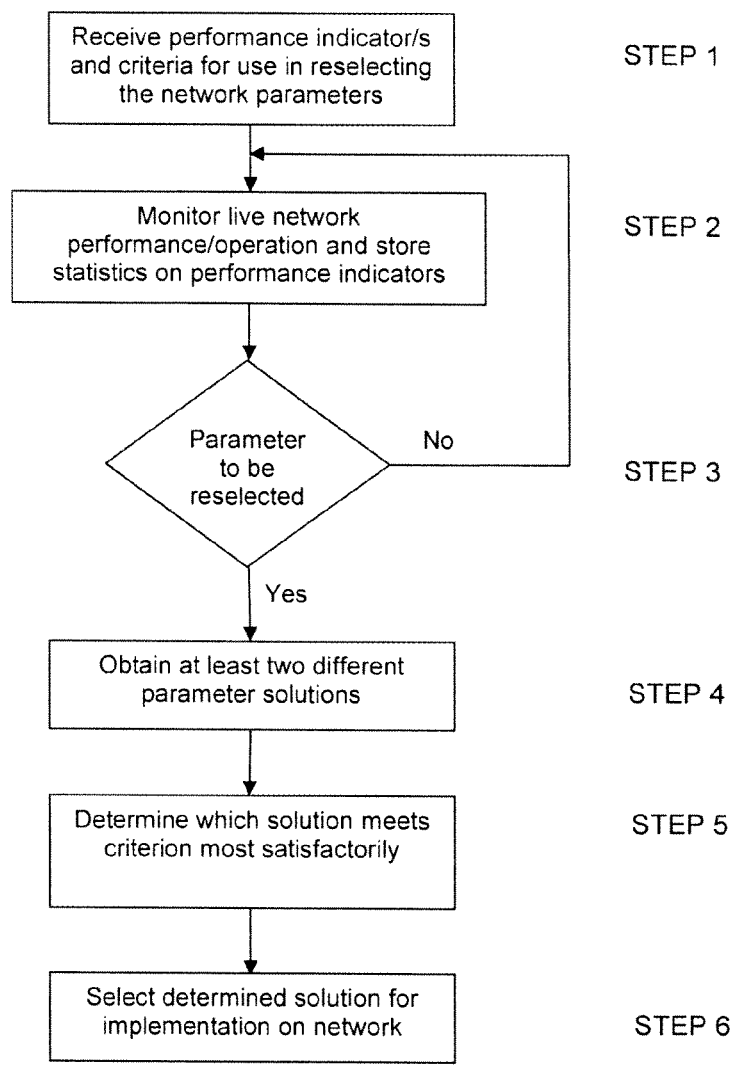
FIG. 1 is a flowchart illustrating a first method embodying the first aspect of the present invention.

A flowchart illustrating a method embodying the first aspect of the present invention is shown in FIG. 1, in which respective values of one or more parameters which affect network performance or operation of a cell or cell sector in a cellular wireless network are re-selected. In STEP 1 of the method, apparatus of the network is caused to receive and store one or more indicators, representing the performance and/or operation of an aspect of the network, and to receive and store at least one criterion to be met by the indicator concerned when the value of the or each parameter has been re-selected. In STEP 2 of the method, apparatus of the network is caused to receive data relating to the present and/or past performance of the network, and/or data relating to the present and/or past operation of the network, derive from that data statistical data relating to the or each said indicator, and store that statistical data. When the value of the or each parameter is to be re-selected, as determined in STEP 3 of the method, in STEP 4 of the method apparatus of the network is caused to obtain at least two different solutions for the value of the or each parameter to be re-selected. In STEP 5 of the method, apparatus of the network is caused to use the said statistical data to determine which of the solutions obtained most satisfactorily meets the or each said criterion for the or each indicator. In STEP 6 of the method, apparatus of the network is caused to select that solution for implementation on the network.

The method of FIG. 1 may be implemented in hardware, or as software modules running on one or more processors (for example, a CPU), or on a combination thereof. That is, those skilled in the art will appreciate that a microprocessor or digital signal processor (DSP) may be used in practice to implement some or all of the functionality described above.

Figure 2:
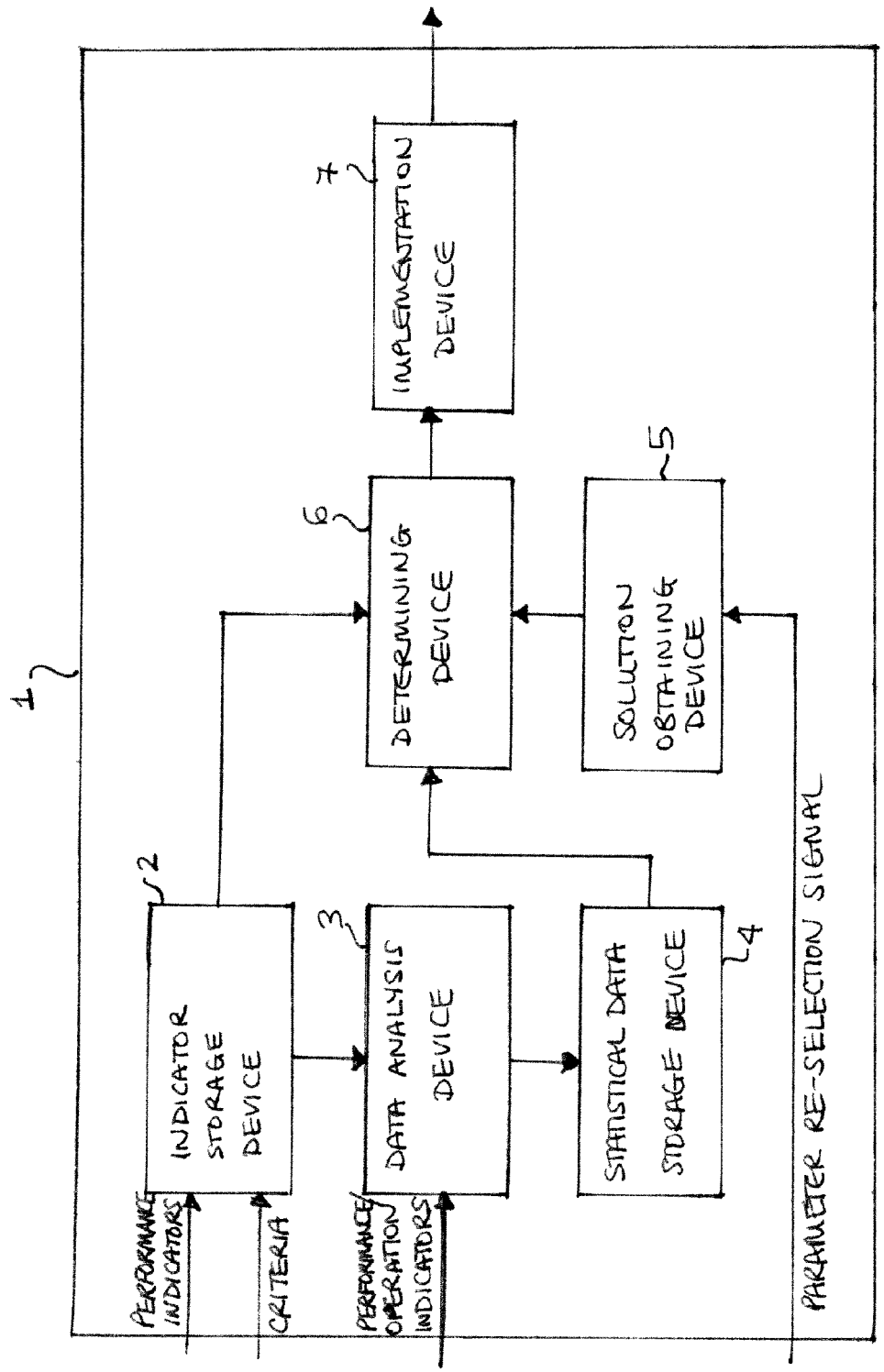
FIG. 2 shows apparatus embodying the second aspect of the present invention, which is suitable for carrying out the method shown in the flowchart of FIG. 1.

By way of example, apparatus 1 embodying the second aspect of the present invention, which is suitable for carrying out the method shown in the flowchart of FIG. 1, is shown in FIG. 2. The apparatus 1 of FIG. 2 is provided in a SON server and may be provided as hardware and/or as software modules running on one or more processors. The apparatus 1 comprises indicator storage device 2, data analysis device 3, statistical data storage device 4, solution obtaining device 5, determining device 6 and implementation device 7. Indicator storage device 2 is configured to receive and store one or more indicators, representing the performance and/or operation of an aspect of the network, and at least one criterion to be met by the indicator concerned when the value of the or each parameter has been re-selected. Data analysis device 3 is configured to receive data relating to the present and/or past performance of the network, and/or data relating to the present and/or past operation of the network, and to derive from that data statistical data relating to the or each said indicator. Statistical data storage device 4 is configured to store that statistical data. Solution obtaining device 5 is operable, when the value of the or each parameter is to be re-selected, to obtain at least two different solutions for the value of the or each parameter to be re-selected. Determining device 6 is configured to use the said statistical data to determine which of the solutions obtained most satisfactorily meets the or each said criterion for the or each indicator. Implementation device 7 is configured to cause that solution to be selected for implementation on the network.

One or more of the indicator storage device 2, data analysis device 3, statistical data storage device 4, solution obtaining device 5, determining device 6 and implementation device 7 may be implemented by software modules running on one or more processors, for example a CPU.

The apparatus of FIG. 2 has been described as being located in a SON server, but in a SON or another type of cellular wireless network the apparatus may be provided elsewhere. For example, in a SON the apparatus can be provided in the SON controller. Although the SON server can reside on one of the base stations, more preferably it is provided at a higher layer than the base stations, typically with the Operations and Maintenance entity (OAM) of the network.

The different devices of the apparatus may all be provided by one element of the network, for example in a SON server as described above where the network is a SON, or by various elements of a SON or other network.

Figure 3:
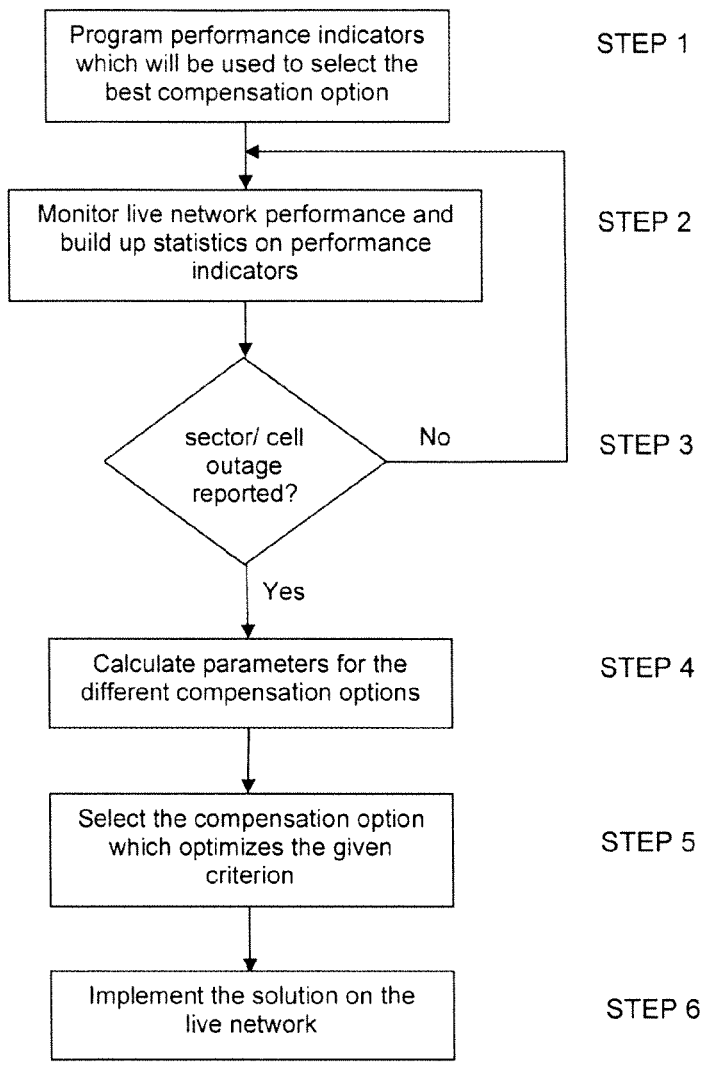
FIG. 3 is a flowchart illustrating a second method embodying the first aspect of the present invention.

In one possible embodiment of the method, the value of the or each parameter is re-selected so as to adapt the coverage of a cell or cell sector of the cellular wireless network so as to cover at least part of a coverage hole of an adjacent cell or cell sector. In this method, in STEP 4 of the flowchart of FIG. 1, the apparatus of the network is caused to employ at least two different cell/cell sector compensation algorithms to determine at least two solutions for the value of the or each parameter which when implemented on the network would adapt the coverage of one or more cell or cells sectors so as to cover at least part of the said coverage hole. A flowchart illustrating the basic steps in this embodiment, as carried out in a SON server of the network, is shown in FIG. 3. The steps shown in FIG. 3 can be carried out by apparatus as shown in FIG. 2, which may be implemented as hardware or as software modules running on one or more processors, for example a CPU.

In STEP 1 of the embodiment, the SON server is caused to receive and store at least one performance indicator which will be used to select the best compensation option, that is to receive and store one or more indicators, representing the performance and/or operation of an aspect of the network, and to receive and store at least one criterion to be met by the indicator concerned when the value of the or each parameter has been re-selected. In STEP 2 of the embodiment, the SON server monitors live network performance and build up statistics on the performance indicators, that is the SON server is caused to receive data relating to the present and/or past performance of the network, and/or data relating to the present and/or past operation of the network, derive from that data statistical data relating to the or each said indicator, and store that statistical data. In STEP 3 of the embodiment, the SON server determines that a cell/sector outage has been reported, and then in STEP 4 calculates parameters for the different compensation options, that is the SON server is caused to employ at least two different cell/cell sector compensation algorithms to determine at least two solutions for the value of the or each parameter which when implemented on the network would adapt the coverage of one or more cell or cells sectors so as to cover at least part of the said coverage hole. In STEP 5 of the embodiment, the SON server selects the compensation option which optimizes (or has the least impact on) the given criterion, that is the SON server is caused to use the said statistical data to determine which of the solutions obtained most satisfactorily meets the or each said criterion for the or each indicator. In STEP 6 of the embodiment, when the SON server has selected a solution (and any required testing of the solution has been carried out), that solution is implemented on the live network.

By way of example only, the application of a method and apparatus embodying the present invention to a scenario in which a cell sector in a demonstrative SON in a small area of London goes into outage will now be described. When the network goes live, the SON server is programmed by the SON controller to continually monitor one or more designated network performance and/or operation indicators and derive statistics from them. It is also programmed with at least one criterion to be met by the performance/operation indicator. How these indicators can be used to derive an optimal solution which meets the given criterion is discussed below, together with a parameter calculation algorithm for the possible compensation options.

Consider a cellular network with 21, three-sector base stations covering a small area of central London in which the cell layout is regular. Although in practice irregular cell layouts are more common, the basic methodology of outage compensation options can be illustrated with this regular network. The event of a single sector going into outage is considered in this example. The default network consists of sites with identical parameter settings. The base sites are 30 m high and radiate 43 dBm transmit power on each of the sectors. The antennas in each sector have a 120° beam-width and 18 dBi directivity gain. These are down-tilted by 4° in the default set-up. This antenna set-up allows the coverage of a sector to extend to 700 m along the bore-sight. The inter-site distance is set at 1100 m.

Figure 4:
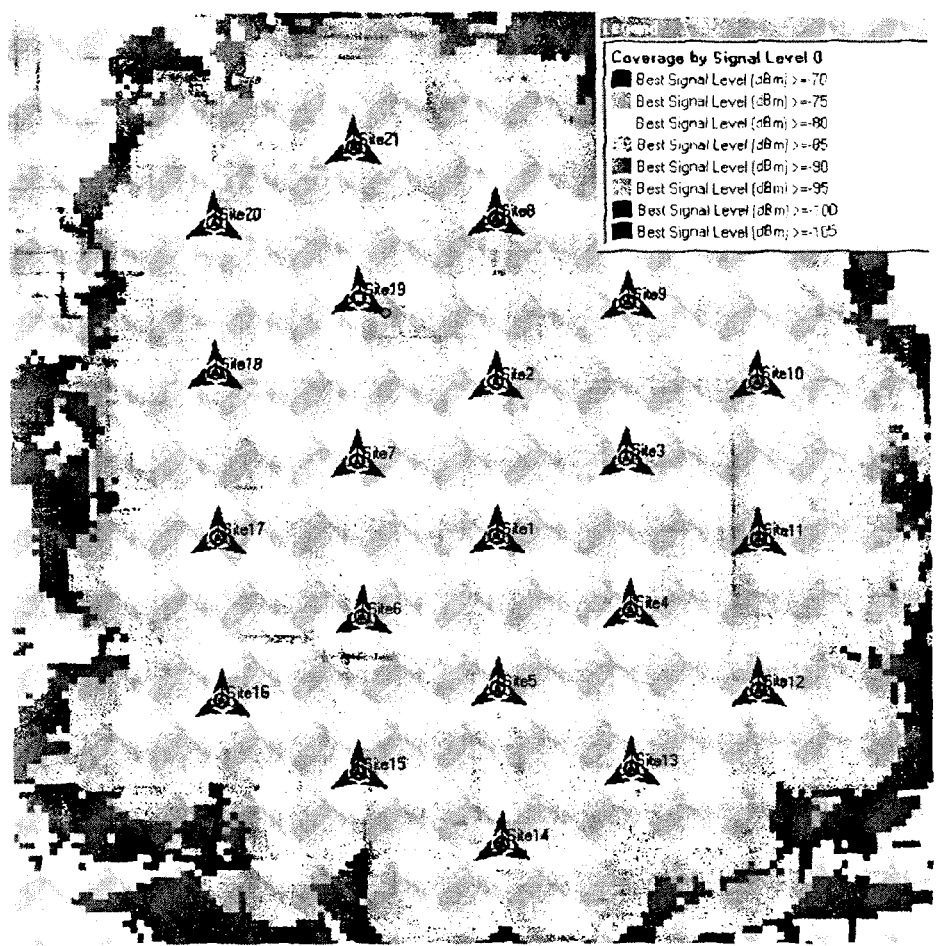
FIG. 4 are coverage plot when a cell sector of a network goes into outage.

The compensation options are all based on adjusting the coverage of the two neighbour sectors of the same site and of the cells in the first tier of neighbours to this site. The intra-sector separation of 120° and the sector beam-width are maintained throughout. FIG. 4 shows the coverage plot when the selected sector goes into outage. The clutter map is not included in the view, as it obscures the coverage levels. However the clutter-related path losses are considered here.

The mechanisms for calculating the compensation options discussed below are similar to those proposed in the applicant's co-pending patent application no. 1100599.8 and allow the compensation parameters for several options to be calculated quickly.

With sector 2 of site 19 going into outage, the signal strength in majority of this sector has degraded to below −95 dBm. The target for the compensation options is to improve coverage of this sector to above −95 dBm. In carrying out this compensation it should be ensured that the coverage level of the contributing sectors should not fall below −95 dBm as well.

Outage Compensation Option I

This solution option comprises shifting the outage footprint to the bore-sight of a neighbour sector (of a neighbour site) and extending the coverage of that neighbour sector. In order to shift (or rotate) the outage footprint, the neighbour sectors of the same site should be rotated. This rotation would be for half the sector beam-width. As we are considering three sector 120° beams, the rotation of neighbour sectors would be by 60°. This rotation would be done electrically (in phased array antennas). In electrical beam shift the maximum shift would be considered at 60°, without extensive widening of the main beam and the generation of grating lobes. With counter-clock wise rotation, the vacant footprint of the sector in outage is shifted to the bore-sight of sector 3 of site 8. The transmit power and down-tilt of this sector (sector 3, site 8) should be adjusted to increase the coverage of this sector, to additionally serve the outage footprint. The additional transmit power required can be calculated as follows, assuming the COST 231 HATA path loss model is used in planning the network:

$$\text{Additional power} = (44.9 - 6.55*\log(h_b))*\log(\text{distance ratio}) - \text{power gain due to extra down-tilt} \quad (1)$$

The distance ratio is the ratio between new coverage distance (i.e. inter-site distance) and the default cell radius. The power gain occurs if the antennas are over tilted in the default setting to provide higher coverage level to a smaller cell/sector size. For example in this illustration, the antennas should be down-tilted by 2.5° to cover the maximum distance. But as they are down-tilted by 4°, there is an extra down tilt of 1.5°. Looking at the antenna vertical pattern, this extra down-tilt causes 1 dB signal attenuation. Hence 1 dB would be the extra gain by using the correct down-tilt. The correct down-tilt for the extended coverage is calculated as follows:

$$\text{Down-tilt} = \tan^{-1}((h_b - h_m - e)/\text{Intersite distance}) \quad (2)$$

The term $h_b$ in equations (1) and (2) relates to the base station antenna height, $h_m$ refers to mobile terminal height and e refers to a elevation difference between the mobile and the base station.

The calculated parameters for this example scenario are as follows:

$$\text{Additional power} = (44.9 - 6.55*\log(30))*\log(1100/700) - 1 \text{ dB} = 5.9 \text{ dB}$$

$$\text{Down-tilt} = \tan^{-1}((30 - 1.5 - 0)/1100)) = 1.5°.$$

By rotating the two sectors of site 19 by 60° counter-clockwise, the new beam patterns fall in the bore-sight of neighbour sector beam patterns. To avoid excessive interference the neighbour sector beam patterns would be rotated by half the angle of original rotation (30° in this case). All 5 1st tier neighbour sites of site 19 (except site 8 which is extending coverage) will have their beam patterns of the 3 sectors rotated counter clockwise by 30°.

While this rotation reduces interference it creates two coverage holes (CH) at 30° off the bore-sight of the two rotated (by 60°) sectors of the site with the outage problem (site 19). To erase these coverage holes, the transmit power of the two sectors needs to be increased. Keeping the same down-tilt as before, the additional power required is given by:

$$\text{Additional power for rotated sectors} = (44.9 - 6.55*\log(h_b))*\log(\text{distance to CH/original distance}) \quad (3)$$

For the example scenario, both the CH's occur at 800 m distance at an angle of 30° from the bore-sight. The original coverage distance at 30° is 650 m. Hence the addition power is calculated as:

$$\text{Additional power for rotated sectors} = (44.9 - 6.55*\log(30))*\log(800/650) = 3.2 \text{ dB}.$$

Figure 5:
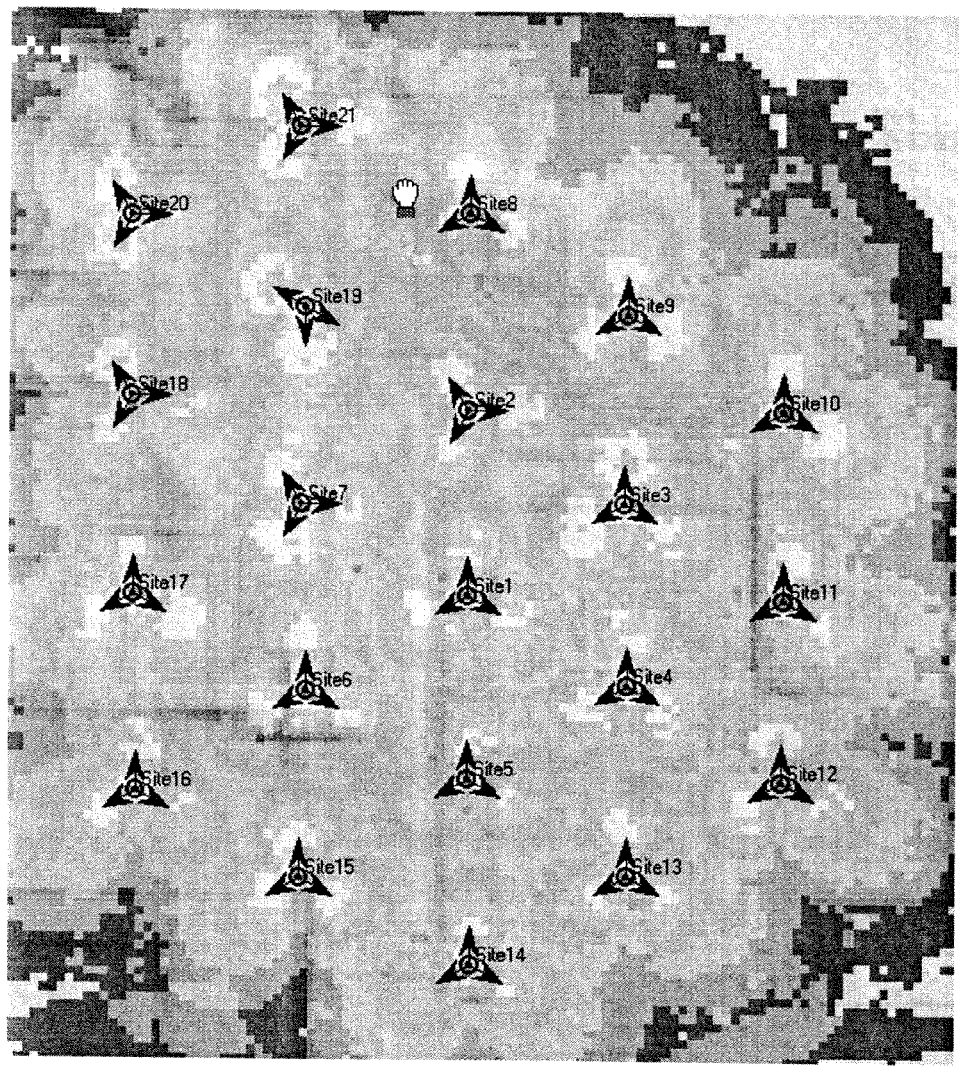
FIGS. 5 to 8 are coverage plots for the cell sector of FIG. 4 showing respective compensation outage solutions.

By following the above steps the sector outage can be compensated. The outage compensated coverage map with these settings is shown in FIG. 5.

This compensation option has succeeded in providing the minimum coverage of above −95 dBm everywhere in the vicinity of the outage. The option requires the sector 3 of site 8 to be able to handle the additional load of the outage footprint created. Also the 60° rotation of sectors in site 19 creates a major handover flow as well as the 30° rotations of 1st tier neighbour create minor handover flows. The compensated coverage received by sector 2 of site 19 splits in half. The top half of the sector receives poor coverage from sector 3 of site 8, while the bottom half of the sector receives relatively good coverage from sector 3 of site 19. A handover zone is created along the bore-sight axis of this sector in outage.

The steps involved in building up this compensation option are summarised below:
- Rotate the azimuth antenna pattern of sector 1 and 3 of site 19 counter clockwise by 60°.
- Extend the transmit power of neighbour sector 3 site 8 by 5.9 dB and reduce the antenna down-tilt to 1.5°.
- Rotate all sectors in the neighbour sites of site 19 (except site 8) counter clockwise by 30°.
- Increase the transmit powers of sector 1 and 3 of site 19 by 3.2 dB.

Outage Compensation Option II

Figure 6:
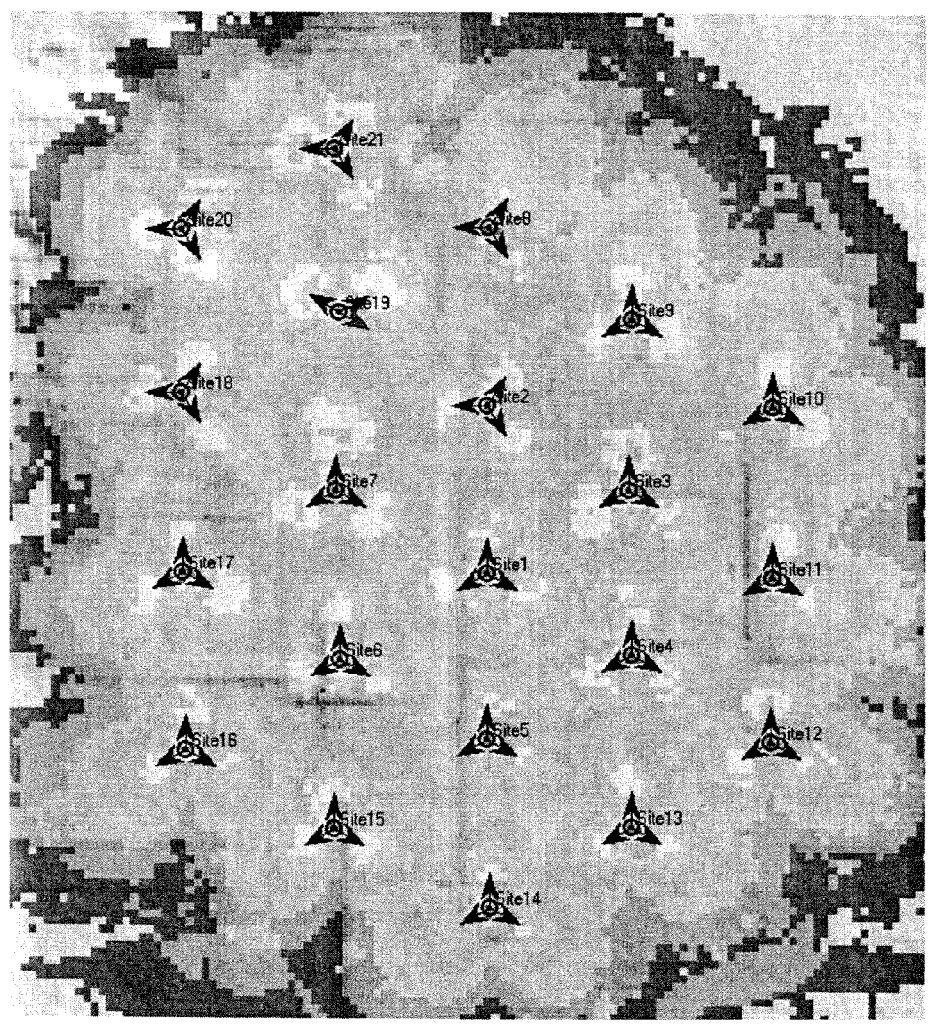

This compensation option is similar to option I, except for the fact that the active neighbour sectors of site 19 are rotated clockwise by 60°. Then the transmit power is increased and the tilt of sector 1 of site 7 adjusted to provide coverage for the vacant foot print. These steps are carried out as per equations (1) and (2). All the sectors of 5, 1st tier neighbour sites to site 19 (except for site 7) are rotated clockwise by 30°. The transmit powers of the two co-site sectors of site 19 are increased as per equation (3), to compensate for coverage holes created by rotations. The outage compensated coverage map for this option II is shown in FIG. 6.

This coverage option too is able to provide the −95 dBm minimum coverage level. As with the previous option, option II also splits the coverage of the outage sector to two uneven segments, with a handover region stretching along the original bore-sight. Similarly, this option involves major flows of handovers to the two co-site sectors (rotated by 60°) and minor flows of handovers to the 1st tier neighbour sectors (rotated by 30°). Sector 1 of site 7 should be capable of handling the additional capacity demand created by the active users in the compensated footprint.

The steps involved in compensation option II are summarised below (the changed values of the parameters are identical as the considered cell layout is regular):
- Rotate the azimuth antenna pattern of sector 1 and 3 of site 19, clockwise by 60°.
- Extend the transmit power of neighbour sector 1 site 7 by 5.9 dB and reduce the antenna down-tilt to 1.5°.
- Rotate all sectors in the neighbour sites of site 19 (except site 7) clockwise by 30°.
- Increase the transmit powers of sector 1 and 3 of site 19 by 3.2 dB.

Outage Compensation Option III

This outage compensation option involves re-directing a sector of the neighbour site towards the vacant footprint and extending its coverage. In this example scenario, the candidate sectors for this coverage extension would be sector 1 and 3 of site 2. Sector 1 needs to be rotated counter clockwise by 60° or sector 3 needs to be rotated clockwise by 60°. Only the former rotation is illustrated as the solutions are otherwise identical.

Figure 7:
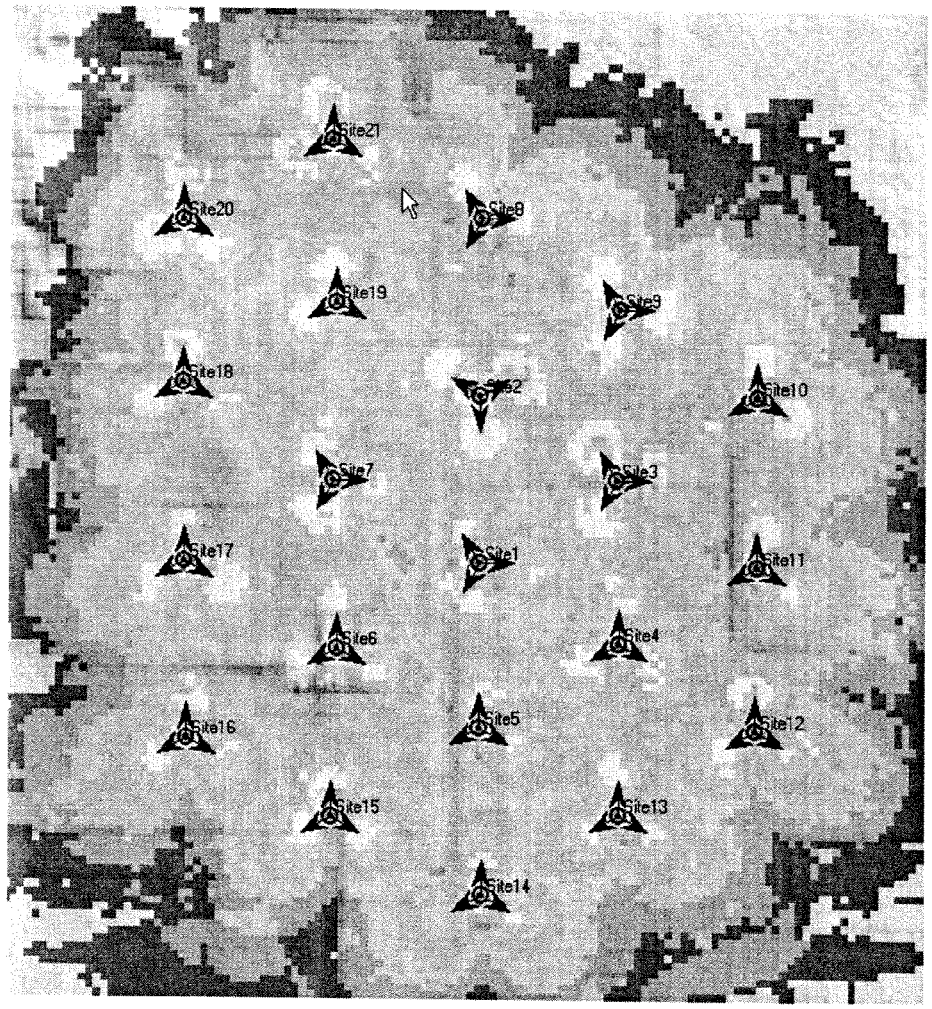

By rotating the three sectors of site 2 counter clockwise by 60°, sector 1 is positioned directly opposite the outage sector (sector 2 of site 19) with their bore-sights aligned. Now the transmit power and down-tilt of sector 1, site 2 needs to be adjusted as per equations (1) and (2) to provide extended coverage. The rotation of the sectors in site 2 creates interference with its $1^{st}$ tier of neighbours. Hence all the sectors in the $1^{st}$ tier to site 2 (except the outage site 19) need to be rotated counter clockwise by 30°. While this reduces the interference, two coverage holes are generated at the cell edges of sector 2 and 3 of site 2, with 30° from the bore-sight. This is identical positioning for the coverage holes seen in options I and II (due to the regular layout of the cells), and these sectors need coverage extension as per equation (3). This coverage solution is illustrated in FIG. 7.

The illustration shows that this coverage option is also able to provide the minimum −95 dBm coverage across the cell outage region. One main advantage of this solution is that the outage footprint is covered by a single sector (rotated sector 1 of site 2) and there are no handover borders within the vacant footprint. However, sector 1 of site 2 should be able to support the additional users with its extended coverage. This coverage option also shifts the changes to cells/sectors from the $1^{st}$ tier of site 19 (as in options I and II) to the $1^{st}$ tier of site 2.

The steps involved in this compensation option III are summarised below (the changed values of the parameters are identical as the considered cell layout is regular):
- Rotate the azimuth antenna pattern of sector 1, 2 and 3 of site 2, counter clockwise by 60°
- Extend the transmit power of neighbour sector 1 site 2 by 5.9 dB and reduce the antenna down-tilt to 1.5°.
- Rotate all sectors in the neighbour sites of site 2 (except site 19) counter clockwise by 30°.
- Increase the transmit powers of sector 2 and 3 of site 2 by 3.2 dB.

Outage Compensation Option IV

Figure 8:
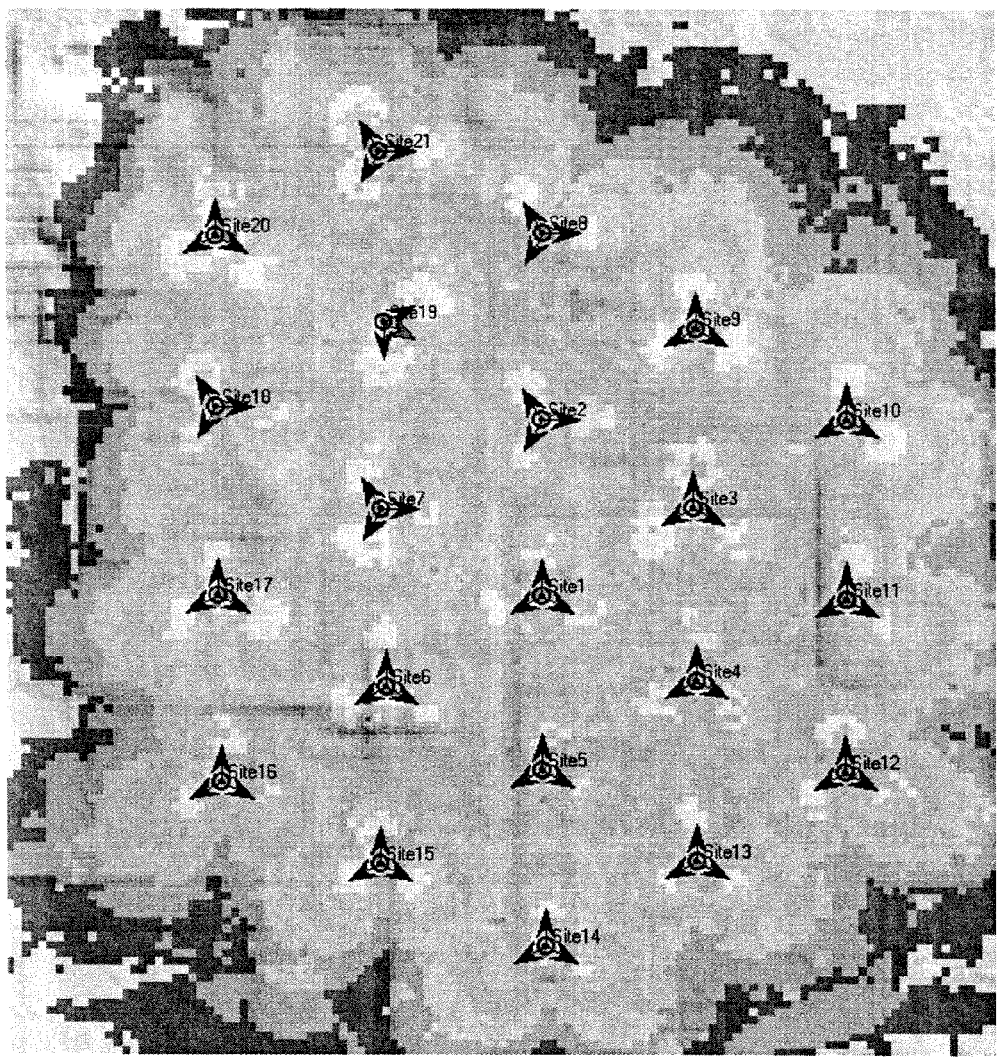

This compensation option involves rotating the footprint of the two remaining active sectors of the outage affected site (site 19) towards the vacant footprint. The coverage foot print of sector 1 of site 19 is rotated clockwise by 60°, while the footprint of sector 3 is rotated counter clockwise by 60°. These rotations create a vacant sector directly at the bore-sight angle of sector 2, site 20. The coverage of this sector should be extended to cover this vacant footprint. This extension requires the increase of transmit power and the adjustment of antenna down-tilt as per equations (1) and (2). The rotations of the neighbour sectors of site 19 create interference to the sector 3 of site 8 and sector 1 of site 7. To avoid this interference, all $1^{st}$ tier neighbour sites of site 19 (except site 20) should be rotated counter-clockwise by 30°. As before, these rotations create coverage holes at 30° angles off the bore-sights of sectors 1 and 3 of site 19 (the affected site). The transmit power of these sectors should be extended as per equation (3). This solution is illustrated in FIG. 8.

As in options I and II, this option also involves significant changes to the two active sectors of site 19, the affected site. These changes involve transferring users from one sector to another through 'forced' handovers (this is discussed later). However, this option produces the best levels of coverage to the affected sector 2 of site 19. A negative point is the creation of a handover boundary at the bore-sight of this outage sector.

The steps involved in this compensation option IV are summarised below (the changed values of the parameters are identical as the considered cell layout is regular):
- Rotate the azimuth antenna pattern of sector 1 of site 19 clockwise by 60° and sector 3 counter clockwise by 60°.
- Extend the transmit power of neighbour sector 2 of site 20 by 5.9 dB and reduce the antenna down-tilt to 1.5°.
- Rotate all sectors in the neighbour sites of site 19 (except site 20) counter clockwise by 30°
- Increase the transmit powers of sector 2 and 3 of site 2 by 3.2 dB.

Having calculated various compensation options, all the options are considered to determine which one meets the criteria for the performance/operation indicator(s) most satisfactorily, as will discussed later.

The coverage maps of FIGS. 5 to 8 show some coverage holes appearing in the first tier of neighbour cells which are rotated by 30°. These are difficult to predict and are caused by local clutter densities. Once an option is selected to compensate for the cell outage, it should be tested on a planning tool of the SON workspace. If some coverage holes appear, there need to be some iterative adjustments (may be beyond the first tier) to compensate for these. The solution should be applied to the live network only when it is perfected on the planning tool of SON.

The execution of the preferred, optimised solution on the live network will involve changing the coverage footprint of many sectors. To maintain coverage to active users while a sector is rotated, secondary carriers must be used as a go-between, for example as explained in the applicant's co-pending application no. PCT/GB10/001,134.

The selection of the most satisfactory option depends on the performance/operation indicator(s) and criteria set by the SON controller and the statistics generated by the SON server, generally over extended periods of live network observation. A few of the many possible different scenarios are discussed below by way of example only:
- The network policy is based on serving the maximum possible amount of network load (for example the performance indicator is network load L and the criterion is maximum possible improvement in network load)—the SON server will make use of load statistics of all sectors including the sector which is in outage. The SON server will select the option where the extended sector and the power increased adjacent sectors can absorb the maximum portion of outage load. Additionally, if load information is available per time of day, the SON server can use this knowledge and the estimated outage time to select the best sector to extend coverage. For example if the outage happened on a residential sector in the evening adjacent to a business district sector, and the estimated outage time is half a day, the SON server can select the business district for compensation even though it may serve a higher average load.

The network policy is to maximize the number of served users (for example, the performance indicator is number of served users N and the criterion is maximum number of served users having at least a specified level of coverage)—the SON server will select the solution which captures the most number of active users with sufficient coverage. This is somewhat related to the load optimisation, however when the users have vastly different data usage profiles, it will not be a direct match.

The network policy is to provide good Quality of Service—QoS—for all the active users or a particular sector (for example, the performance indicator is quality of service Q and the criterion is whether a QoS metric exceeds a specified value for all active users or the particular sector)—the SON server will select the option which will provide the best overall coverage to all of the network or the particular sector.

The network policy is based on providing the best Quality of Service—QoS—for a particular sector which provides optimal revenue generation (for example, the performance indicators are quality of service Q and revenue generation R and the criteria are whether a quality of service metric exceeds a specified value for a particular sector which optimises revenue)—the SON server will monitor these statistics on all the related sectors. It will select an option which provides best possible coverage to the higher revenue generation sectors. This could be fine tuned as per time of day, if such information is available.

The network policy is based on energy saving (for example, the performance indicator is transmit power P and the criterion is whether the solution provides the minimum overall increase in transmit power)—the SON server will look at the overall increase in transmit power for all the options and select the option with the minimum power increase.

If user location information is also available (this will be a feature of LTE-A release 10), the SON server can build up statistical maps of user activity. This will enable the SON server to differentiate network load and revenue generation (just two example parameters) for different regions. It can use this information for selecting the best option as per some of the policy criterion listed above. If the granularity (resolution) of these regions is finer than a sector footprint, this methodology could provide more accurate compensation strategies.

The above possibilities can be used in combination or individually. By way of example, a generalized optimization metric (M) is given below in equation (4), where $w_L$, $w_N$, $w_Q$, $w_R$ and $w_P$ are respective predetermined weighting factors for the five scenarios detailed above.

$$M = w_L \cdot \frac{L_{new}}{L_{old}} + w_N \cdot \frac{N_{new}}{N_{old}} + w_Q \cdot \frac{Q_{new}}{Q_{old}} + w_R \cdot \frac{R_{new}}{R_{old}} + w_P \cdot \frac{P_{old}}{P_{new}} \quad (4)$$

The suffix 'new' refers to the resulting performance indicators for the possible new solution for the parameter. The suffix 'old' refers to the performance indicators for the present parameter values. The weighting factors $w_L$, $w_N$, $w_Q$, $w_R$ and $w_P$ will have values ranging from 0 to 1. If only one of the performance indicators is to be employed, the related weighting factor will be 1 and the others zero. In the general case, all weighting factors will have fractional values with their sum being equal to 1. Note that the terms $P_{old}$ and $P_{new}$ are reversed when compared to other terms in equation (4), as the objective is to minimize the power consumption. Although the example metric M contains terms for only five performance indicators, this can be extended (or reduced) with the addition (or subtraction) of terms as appropriate.

Even more generally, in a method embodying the present invention, determining which of the solutions obtained most satisfactorily meets the or each said criterion for the or each indicator may comprise calculating the maximum value for a metric $$M = \frac{1}{K} \sum_{b=1}^{b=B} w_{Ib} \cdot \frac{I_b'}{I_b} + \frac{1}{K} \sum_{c=1}^{c=C} w_{Ic} \cdot \frac{I_c}{I_c'} \quad (5)$$

where the total number of indicators to be considered is A, of which the number of indicators having a maximising criterion is B and the number of indicators having a minimising criterion is C, where A=B+C, $I_b$ is the value of the bth indicator of the B indicators for the present parameter value(s), $I_c$ is the value of the cth indicator of the C indicators for the present parameter value(s), $I_b'$ is the bth indicator for the possible new solution for the parameter values(s), $I_c'$ is the value of the cth indicator of the C indicators for the possible new solution for the parameter values(s), $w_{Ib}$ is a predetermined weighting factor for the bth indicator, and $w_{Ic}$ is a predetermined weighting factor for the cth indicator, where $$\sum_{b=1}^{b=B} w_{Ib} + \sum_{c=1}^{c=C} w_{Ic} = K.$$

The indicators considered may be those which relate to only a single cell/sector, or a group of cells/sectors, directly affected by the parameter re-selection, or may, more preferably, relate to all cells/sectors in a region of the network which includes not only the single cell/sector, or group of cells/sectors, directly affected by the parameter re-selection, but also any other cells/sectors (such as the first, and possibly also the second, tier of cells/sectors neighbouring the directly-affected cells/sectors) which are indirectly affected by the parameter re-selection (for example, where coverage is extended by some cells/sectors, other cells/sectors may have to adjust their coverage to avoid interference).

Although described separately, each of the different embodiments of the invention may be combined with any other embodiment, as appropriate.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A method of re-selecting respective values of one or more parameters which affect network performance or operation of a cell or cell sector in a cellular wireless network, the method comprising:

causing apparatus of the network to receive and store one or more indicators, representing the performance and/or operation of an aspect of the network, and one or more criteria to be met by the indicator concerned when the value of each of the one or more parameters has been re-selected;

causing apparatus of the network to receive data relating to the present and/or past performance of the network, and/or data relating to the present and/or past operation of the network, and to derive from that data statistical data relating to each of the one or more indicators;

causing apparatus of the network to store that statistical data;

when the value of each of the one or more parameters is to be re-selected, causing apparatus of the network to obtain at least two different solutions for the value of each of the one or more parameters to be re-selected;

causing apparatus of the network to use the said statistical data to determine which of the solutions obtained most satisfactorily meets each of the one or more criteria for each of the one or more indicators; and causing apparatus of the network to select that solution for implementation on the network.

2. A method as claimed in claim 1, wherein determining which of the solutions obtained most satisfactorily meets each of the one or more criteria for each of the one or more indicators comprises:

calculating the maximum value for a metric $$M = \frac{1}{K}\sum_{b=1}^{b=B} w_{Ib} \cdot \frac{I'_b}{I_b} + \frac{1}{K}\sum_{c=1}^{c=C} w_{Ic} \cdot \frac{I_c}{I'_c}$$

where the total number of indicators to be considered is A, of which the number of indicators having a maximising criterion is B and the number of indicators having a minimising criterion is C, where A=B+C, $I_b$ is the value of the bth indicator of the B indicators for the present parameter value(s), $I_c$ is the value of the cth indicator of the C indicators for the present parameter value(s), $I_b'$ is the bth indicator for the possible new solution for the parameter values(s), $I_c'$ is the value of the cth indicator of the C indicators for the possible new solution for the parameter values(s), $w_{Ib}$ is a predetermined weighting factor for the bth indicator, and $w_{Ic}$ is a predetermined weighting factor for the cth indicator, where $$\sum_{b=1}^{b=B} w_{Ib} + \sum_{c=1}^{c=C} w_{Ic} = K.$$

3. A method as claimed in claim 1, wherein the said indicators relate to all cells/sectors in a region of the network which includes not only a single cell/sector, or a group of cells/sectors, which will be directly affected by the parameter re-selection, but also any other cells/sectors which may be indirectly affected by the parameter re-selection.

4. A method as claimed in claim 1, wherein the value of each of the one or more parameters is re-selected so as to adapt the coverage of a cell or cell sector of the cellular wireless network so as to cover at least part of a coverage hole of an adjacent cell or cell sector.

5. A method as claimed in claim 4, wherein the step of causing apparatus of the network to obtain at least two different solutions for the value of each of the one or more parameters to be re-selected comprises:

causing the apparatus to employ at least two different cell/cell sector compensation algorithms to determine at least two solutions for the value of each of the one or more parameters which when implemented on the network would adapt the coverage of one or more cell or cells sectors so as to cover at least part of the said coverage hole.

6. A method as claimed in claim 1, wherein the indicator is cell, or cell sector, transmit power and the criterion is whether the solution provides the minimum overall increase in transmit power of the network.

7. A method as claimed in claim 1, wherein the indicator is network load and the criterion is whether the solution provides the maximum possible improvement in network load.

8. A method as claimed in claim 1, wherein the indicator is cell, or cell sector, quality of service and the criterion is whether a quality of service metric for the solution exceeds a specified value.

9. A method as claimed in claim 1, wherein the indicator is number of served users and the criterion is whether the solution provides the maximum of served users having at least a specified level of coverage.

10. Apparatus for re-selecting respective values of one or more parameters which affect network performance or operation of a cell or cell sector in a cellular wireless network, the apparatus comprising:

indicator storage means configured to receive and store one or more indicators, representing the performance and/or operation of an aspect of the network, and at least one criterion to be met by the indicator concerned when the value of each of the one or more parameters has been re-selected;

data analysis means configured to receive data relating to the present and/or past performance of the network, and/or data relating to the present and/or past operation of the network, and to derive from that data statistical data relating to each of the one or more indicators;

statistical data storage means configured to store that statistical data;

solution obtaining means operable, when the value of each of the one or more parameters is to be re-selected, to obtain at least two different solutions for the value of each of the one or more parameters to be re-selected;

determining means configured to use the said statistical data to determine which of the solutions obtained most satisfactorily meets each of the one or more criteria for each of the one or more indicators; and implementation means configured to cause that solution to be selected for implementation on the network.

11. Apparatus as claimed in claim 10, wherein the determining means are operable to determine which of the solutions obtained most satisfactorily meets each of the one or more criteria for each of the one or more indicators by:

calculating the maximum value for a metric $$M = \frac{1}{K}\sum_{b=1}^{b=B} w_{lb} \cdot \frac{I'_b}{I_b} + \frac{1}{K}\sum_{c=1}^{c=C} w_{lc} \cdot \frac{I_c}{I'_c}$$

where the total number of indicators to be considered is A, of which the number of indicators having a maximising criterion is B and the number of indicators having a minimising criterion is C, where A=B+C, $I_b$ is the value of the bth indicator of the B indicators for the present parameter value(s), $I_c$ is the value of the cth indicator of the C indicators for the present parameter value(s), $I_b'$ is the bth indicator for the possible new solution for the parameter values(s), $I_c'$ is the value of the cth indicator of the C indicators for the possible new solution for the parameter values(s), $w_{Ib}$ is a predetermined weighting factor for the bth indicator, and $w_{Ic}$ is a predetermined weighting factor for the cth indicator, where $$\sum_{b=1}^{b=B} w_{lb} + \sum_{c=1}^{c=C} w_{lc} = K.$$

12. Apparatus as claimed in claim 10, wherein the said indicators relate to all cells/sectors in a region of the network which includes not only a single cell/sector, or a group of cells/sectors, which will be directly affected by the parameter re-selection, but also any other cells/sectors which may be indirectly affected by the parameter re-selection.

13. Apparatus as claimed in claim 10, configured to re-select the value of each of the one or more parameters so as to adapt the coverage of a cell or cell sector of the cellular wireless network so as to cover at least part of a coverage hole of an adjacent cell or cell sector.

14. Apparatus as claimed in claim 13, wherein the solution obtaining means are operable to employ at least two different cell/cell sector compensation algorithms to determine at least two solutions for the value of each of the one or more parameters which when implemented on the network would adapt the coverage of one or more cell or cells sectors so as to cover at least part of the said coverage hole.

15. Apparatus as claimed in claim 10, wherein the indicator is cell, or cell sector, transmit power and the criterion is whether the solution provides the minimum overall increase in transmit power of the network.

16. Apparatus as claimed in claim 10, wherein the indicator is network load and the criterion is whether the solution provides the maximum possible improvement in network load.

17. Apparatus as claimed in claim 10, wherein the indicator is cell, or cell sector, quality of service and the criterion is whether a quality of service metric for the solution exceeds a specified value.

18. Apparatus as claimed in claim 10, wherein the indicator is number of served users and the criterion is whether the solution provides the maximum of served users having at least a specified level of coverage.

19. A non-statutory computer-readable medium carrying instructions which, when carried out on a computer, cause that computer to carry out a method as claimed in claim 1.

20. A non-statutory computer-readable medium carrying instructions which, when carried out on a computer, cause that computer to become apparatus as claimed in claim 10.

* * * * *